2,915,539
Patented Dec. 1, 1959

2,915,539

PROCESS FOR THE PREPARATION OF CYCLO-PENTADIENYL MANGANESE TRICARBONYL COMPOUNDS

Charles R. Bergeron and Arthur F. Limper, Baton Rouge, La., assignors to Ethyl Corporation, New York, N.Y., a corporation of Delaware No Drawing. Application December 17, 1957
Serial No. 703,285

8 Claims. (Cl. 260—429)

This invention relates to the manufacture of organo manganese compounds and, more particularly, to a process for the manufacture of cyclopentadienyl manganese tricarbonyl compounds.

Cyclopentadienyl manganese tricarbonyl compounds have been found to be exceptionally effective antiknocks for gasoline used in internal combustion engines. One preferred method of manufacture of these compounds involves a three-step process; (1) reaction of sodium metal with a cyclopentadiene hydrocarbon; (2) reaction of manganous chloride with the cyclopentadienyl sodium compound formed in step 1; and (3) reaction of the bis(cyclopentadienyl) manganese compound formed in step 2 with carbon monoxide. All of the above steps are conducted in an ether or amine solvent. In a once-through process, it is found that relatively high yields, i.e. 80 to 90 percent of the desired cyclopentadienyl manganese tricarbonyl compounds are produced and recoverable. However, when the solvent or unreacted components are recovered and recycled to the process, the yield of the desired product is materially decreased, usually from 10 to 25 percent of the normal yield. Moreover, the appearance of the reaction mixtures, rate of reaction and other process characteristics are usually greatly changed in the recycle process.

It is accordingly an object of this invention to provide an improved process for the manufacture of cyclopentadienyl manganese tricarbonyl compounds. Another object is to provide a process wherein certain materials, such as solvent and unreacted cyclopentadiene compounds, can be reused in the process, while still obtaining optimum yields of the desired cyclopentadienyl manganese tricarbonyl compound. Other objects of this invention will become more apparent in the following description and appended claims.

These and other objects of the present invention are accomplished if the concentration of cyclopentadienyl manganese tricarbonyl compounds in the initial reaction of sodium and the cyclopentadienyl hydrocarbon is maintained below about 0.1 percent by weight of the sodium metal employed in the reaction, preferably below 0.085 weight percent. It has been found that the cyclopentadienyl manganese tricarbonyl compound apparently acts as a catalyst for undesired side reactions, thus resulting in the formation of by-products and materially reducing the formation of the desired cyclopentadienyl manganese tricarbonyl product. Moreover, the ether or amine solvent is actually destroyed and cannot be recovered. For example, if about 0.3 percent of methylcyclopentadienyl manganese tricarbonyl, based on the weight of sodium, is present when reacting sodium and methylcyclopentadiene, the yield of methylcyclopentadienyl manganese tricarbonyl is decreased a total of 5 percent. If only about 1.2 percent of methylcyclopentadienyl manganese tricarbonyl is present, a resultant yield decrease of 8 percent is encountered. At only slightly higher concentrations of the cyclopentadienyl compound, even greater yield decreases result.

The catalytic activity of the cyclopentadienyl manganese tricarbonyl compounds is very surprising and unexpected. In fact, the actual mechanism of the undesired reaction is not understood. However, it is known that it seriously affects all steps of the reaction. For example, in the reaction of the cyclopentadiene hydrocarbon with sodium, the reaction mixture has an entirely different appearance, the mixture having a dark color and containing metallic manganese. At the same time, however, the hydrogen evolution appears to be as great as in a normal reaction, i.e. a reaction conducted in the absence of cyclopentadienyl manganese tricarbonyl compounds. It is believed that a large fraction of the hydrogen in this instance results from a reaction between the sodium and solvent since the recovery of solvent following the reaction is appreciably less than in a normal reaction. At the same time, there is evidence that the cyclopentadienyl manganese tricarbonyl catalyzes reaction between sodium and the cyclopentadienyl sodium compound.

The reaction of the manganous chloride appears to proceed smoothly but this may be due to the fact that the manganous chloride is reacting with sodium-containing by-products. In any regard, when this reaction mixture is treated with carbon monoxide, a large fraction of the manganese intermediate is completely unreactive with carbon monoxide. Thus, although this phenomena is not completely understood, it appears possible that the cyclopentadienyl manganese tricarbonyl catalyzes reaction of the sodium with the solvent or with cyclopentadienyl sodium or both, and this or these reaction products, while reactive with manganous chloride, form a product which does not carbonylate nor form the desired cyclopentadienyl manganese tricarbonyl product.

More specifically the process of this invention comprises the reaction of sodium and a cyclopentadiene compound in an ether or amine solvent at a temperature of from about 0–250° C. to form sodium cyclopentadienyl compounds, thereafter adding to this reaction product a manganous salt, such as the chloride; to form the bis(cyclopentadienyl) manganese compound. This reaction is normally carried out at a temperature of about 50–250° C. Carbon monoxide is then added to this second reaction mixture to convert the bis(cyclopentadienyl) manganese compound to the corresponding cyclopentadienyl manganese tricarbonyl compound. The carbonylation reaction is best carried out at a temperature of from about 50–300° C., using carbon monoxide pressures of from atmospheric to about 10,000 pounds. The volatile cyclopentadiene (monomer or polymer) and the solvent are then separated from the reaction mixture and recycled to the sodium reaction. Any recycled material is freed of the cyclopentadienyl manganese tricarbonyl product sufficiently to maintain the concentration of the cyclopentadienyl manganese tricarbonyl product in the sodium reaction mixture below about 0.1 weight percent, based upon the weight of sodium.

In recovering the unreacted cyclopentadiene and solvent, a preferred method is to first distill the volatile components of the crude reaction product i.e. components boiling below about 150° C. and preferably 100° C. at 2 millimeter mercury pressure, from the high polymers and inorganic salts, i.e. sodium chloride and unreacted manganous chloride. During distillation, it is best to maintain these non-volatile impurities in a fluid state such as by the addition of a high boiling aromatic hydrocarbon, such as naphthalene, alkylated naphthalenes, diphenyl, etc. for easy and efficient removal from the vacuum distillation still. The volatile components can thereafter be fractionated.

A particularly preferred method of separating the volatile components, i.e. cyclopentadiene compound, solvent, traces of high boiling aromatic suspending agent and product involves fractionation at a sufficient pressure to maintain the temperature above about 160° C. and preferably above about 200° C. to decompose relatively unstable components particularly cyclopentadiene dimer which form low boiling by-products during the separation operation. A particularly useful technique involves the concurrent fractionation of both the solvent and cyclopentadiene compound fractions during this stabilization operation. Thus, a convenient means involves feeding the volatile, impure product into a fractionating column maintained at a bottoms temperature above about 160° C. and simultaneously removing the cyclopentadiene compound and solvent overhead, while removing the cyclopentadienyl manganese tricarbonyl compound and aromatic suspending agent at the bottom of the column. This technique has been found to give extremely pure solvent and cyclopentadiene compound which can be recycled either together or separately directly to the sodium reaction. If desired, the cyclopentadiene can be first dimerized, i.e. before recycle, to prevent a too rapid reaction with sodium. This can be done using polymerization catalyst, e.g. peroxide or metal alkyls such as aluminum triethyl or merely by heating, i.e. at temperatures above about 50° C. Pure cyclopentadienyl manganese tricarbonyl product can be obtained by fractionation from the suspending agent. Using this procedure, the product has been found to be exceptionally pure.

The above process is particularly suitable for the manufacture of a wide variety of cyclopentadienyl manganese tricarbonyl compounds in which the cyclopentadienyl group contains a five carbon ring, such as found in cyclopentadiene itself. This cyclopentadienyl group can be substituted with one or more monovalent hydrocarbon radicals or can be of a condensed ring type, such as the indenyl or fluorenyl type. The process is particularly suitable for the manufacture of compounds in which the cyclopentadienyl group contains 5–13 carbon atoms. These compounds have a molecular weight of up to 315. Typical examples are cyclopentadienyl manganese tricarbonyl, methylcyclopentadienyl manganese tricarbonyl, ethylcyclopentadienyl manganese tricarbonyl, butylcyclopentadienyl manganese tricarbonyl, hexylcyclopentadienyl manganese tricarbonyl, triethylcyclopentadienyl manganese tricarbonyl, methylindenyl manganese tricarbonyl and the like.

The following examples illustrate the novel features of the process of this invention. In these examples, the quantitative units are given in parts by weight.

EXAMPLE I

Methylcyclopentadiene dimer is gradually added to sodium metal (1526 parts) in diethylene glycol dimethyl ether (4313 parts) in a reactor provided with heating means and means to agitate the mixture. The solvent was previously used in other similar reactions. The total feed of methylcyclopentadiene over a 2-hour period was 5,870 parts. The reaction was continued for 1 hour at 185° C. and thereafter the temperature was raised to 190° C. for an additional hour to complete the reaction. The reaction mixture was stirred during the entire reaction. Hydrogen gas was evolved and recovered from the reactor. Thereafter, 4,278 parts of flaked, anhydrous manganous chloride (97 percent pure) was added to the reaction mixture and the reaction was maintained at a temperature of 165° until all evidence of reaction had ceased. The reaction mixture was also agitated during this reaction. The reaction mixture was then transferred to a pressure vessel provided with an agitator and to this reaction mixture was added carbon monoxide at a pressure of 300 p.s.i.g. The total carbon monoxide consumed in the reaction was 2,450 parts. The reaction was maintained at a temperature of 193° C.

The crude reaction mixture was then discharged to a vacuum distillation still and the volatile components removed by distillation at a pressure of about 20 millimeters of mercury. The overhead temperature at the end of this vacuum distillation was between 80 and 110° C. When most of the volatile material was removed, 5,640 parts of a high boiling hydrocarbon mixture which is predominantly benzene and naphthalene derivatives sold under the trade name Enjay HB Aromatic Form 9700, marketed by Esso Standard Oil Company, was added to the still. This aromatic mixture has an initial boiling point of about 145° C. at 20 millimeters mercury pressure. The vacuum distillation was continued until no volatile materials were left in the residue. These volatile components were then subjected to fractionation in a 30 plate column. The fractionation was continued at atmospheric temperature and the crude material was injected into the column on thte fifteenth plate. The solvent and cyclopentadiene (monomer) were removed overhead and recycled to the sodium reactor for a second cycle. The monomer was fed directly to the sodium reaction. However, in other runs, it is first dimerized by heating for several hours at 120° C. This results in a less vigorous reaction with sodium. The total methylcyclopentadienyl manganese tricarbonyl in the solvent cyclopentadiene mixture was less than 0.001 part per part of sodium. The above process was repeated and the yields obtained in this and subsequent cycles were essentially identical to the yields obtained in the first cycle in which fresh solvent was employed. It is found that about 95 percent or more of the ether solvent is recovered in this process and only minor quantities of fresh solvent are required to make up the solvent loss in the process.

In second and subsequent cycles only about 0.085 part of methylcyclopentadienyl manganese tricarbonyl were present in the sodium reaction per part of sodium metal. The recovered yield of methylcyclopentadienyl manganese tricarbonyl in each of the cycles discussed above is about 80 percent. When the above procedure is repeated, except that the recycle materials contain more cyclopentadienyl manganese tricarbonyl to give a total concentration of about 0.3 percent in the sodium reaction, the yield of desired product is reduced about 5 percent, i.e. total yield of 75.

The purified methylcyclopentadienyl manganese tricarbonyl compound when mixed with gasoline increases appreciably the octane rating of the gasoline. The following table illustrates the effectiveness of methylcyclopentadienyl manganese tricarbonyl, using a commercial gasoline having an initial boiling point of 94° F. and a final boiling point of 390° F. The antiknock value of the fuel determined by the ratings are given in octane numbers for figures below 100 and in Army-Navy performance numbers for values above 100. The method of determining performance numbers is explained in the booklet, "Aviation Fuels and Their Effect Upon Engine Performance," NAVAER–06–5–501, USAF T.O. No. 06–5–54, published in 1951.

Table.—*Commercial gasoline having an I.B.P. of 94° F. and an F.B.P. of 390° F.*

| $C_6H_7Mn(CO)_3$, g. metal/gal. | Octane Rating |
|---|---|
| 0 | 83.1 |
| 1.0 | 92.7 |
| 2.0 | 95.8 |
| 3.0 | 98.0 |
| 5.0 | 102.0 |

When the above example is repeated using an excess of manganous chloride with sodium metal, magnesium hydride or aluminum triethyl, similar results are obtained. In these examples, a mole of both the manganous chloride (excess) and the reducing agent is used.

EXAMPLE II

Example I is repeated except that monomeric cyclopentadiene is employed instead of methylcyclopentadiene dimer and the solvent used is diethyl ether. The temperature of the reaction is maintained at about 40° C. The sodium is initially dispersed in an equal weight of kerosene. The product following carbonylation is recovered as in Example I except that vacuum distillation of the impure volatile fraction is employed and only one-half of the recovered cyclopentadiene is recycled to the process. In this instance, the quantity of cyclopentadienyl manganese tricarbonyl in the sodium reaction is below about 0.02 weight percent, based upon the weight of the sodium.

EXAMPLE III

Example I is repeated except that monomer is used, tetrahydrofuran solvent (at reflux) is employed instead of diethylene glycol dimethyl ether and manganous acetate is used instead of manganous chloride, in molar equivalent quantities. In this instance, the methylcyclopentadienyl manganese tricarbonyl is recovered by steam distillation from the crude reaction mixture in the presence of methylated naphthalene having an initial boiling point of 145° C. at 20 millimeter mercury pressure. The methylated naphthalene is employed in an equivalent weight relative to the weight of crude reaction product. The residue, containing the inorganic salts and high polymers, is maintained fluid during steam distillation by the methylated naphthalene. The volatile components are fractionated to free the unreacted methylcyclopentadiene and solvent from methylcyclopentadienyl manganese tricarbonyl, prior to recycle. The product concentration is maintained below about 0.01 weight percent of sodium in the sodium reaction step.

When the above examples are repeated using dibutyl ether, didecyl ether, ethylene glycol dimethyl ether, diethylene glycol methyl ethyl ether and triethylene glycol dibutyl ether, similar results are obtained. Also, comparable results are obtained using manganese propionate, manganese nitrate, manganese sulfide and manganese dioxide.

EXAMPLE IV

Example III is repeated except that n-decylcyclopentadiene is reacted with sodium in the presence of two moles of aniline solvent per mole of sodium. The manganous chloride, also substituted in this reaction for the acetate, is reacted in excess, equivalent to 20 percent by weight. The n-decylcyclopentadienyl manganese tricarbonyl is recovered by steam distillation in the presence of two parts of trisodium phosphate per 100 parts of crude reaction product to maintain the distillation residue in a finely divided dispersion in a water phase. The impure volatile mixture is fractionated and the solvent recycled. The quantity of n-decylcyclopentadienyl manganese tricarbonyl in the sodium reaction is maintained below 0.001 percent by weight of the sodium metal.

When dimethyl amine, tetramethyl methylene diamine and N-methyl morpholine are employed as solvent, similar results are obtained.

EXAMPLE V

Example I is repeated except that iron pentacarbonyl is employed instead of gaseous carbon monoxide. The reaction product in this case is methylcyclopentadienyl manganese tricarbonyl and ferrocene. The solvent which is recovered and recycled as in Example I and the iron cyclopentadienyl compounds are decomposed by reaction with lithium metal and liquid ammonia. The methylcyclopentadiene recovered from this decomposition and the diethylene glycol dimethyl ether recovered from the crude reaction product are recycled to the sodium reaction step of the process, after separation of the methylcyclopentadienyl manganese tricarbonyl. The iron and iron compounds formed in the decomposition of the ferrocene can be treated with carbon monoxide in accordance with the procedure given in J. Am. Chem. Soc., vol. 79, pp. 2746-49, 1957. The decomposition products are thereafter recycled to the process. It is particularly desirable to use a relatively inexpensive dilute carbon monoxide stream in regenerating the iron carbonyl, thus eliminating the cost of highly pure carbon monoxide which is necessary in the usual carbonylation reaction using gaseous carbon monoxide with bis(cyclopentadienyl) manganese compounds.

Similar results are obtained in the above example using copper carbonyl, vanadium carbonyl, chromium carbonyl, cobalt carbonyl and nickel carbonyl.

EXAMPLE VI

Example I is repeated except that monomeric indene is reacted with sodium metal in cyclohexylamine and the resulting indenyl sodium is reacted with manganous bromide in a molecular proportion of 1 mole of manganous bromide per mole of indenyl sodium. This mixture forms a mixed salt, indenyl manganese bromide, which is carbonylated with 500 pounds CO pressure in the presence of 1 mole of sodium hydride. The cyclohexylamine is recovered from the indenyl manganese tricarbonyl product in accordance with Example I and recycled to the sodium reaction. The cyclohexylamine is freed of product sufficiently to maintain, after repeated recycle, the concentration of product in the sodium reaction below about 0.05 weight percent based upon the weight of sodium.

The reaction of sodium and cyclopentadiene or its derivatives can be conducted in ether or amine solvents at widely varying temperature conditions, generally from about −50° to 300° C. The preferred temperature depends both upon the specific solvent employed and upon the cyclopentadiene hydrocarbon which is reacted with sodium. Some of the cyclopentadiene compounds are difficult to maintain in monomeric form and thus they are more convenient to use in dimeric or low polymeric form. With these compounds, temperatures in the range of 150° to 250° C. are preferred, especially between 180° and 195° C. When monomeric cyclopentadiene compounds are used, temperatures in the range of 100°–150° C. give best results. Above 100° C. the sodium is in liquid form and thus the system can be merely agitated mildly to maintain a homogeneous mixture of the sodium and the reaction medium.

Many of the most useful cyclopentadiene hydrocarbons have a relatively low boiling point, at least in their monomeric form. With these hydrocarbons, the feed to the sodium reaction is maintained essentially equivalent to their rate of reaction to prevent vaporization and loss with the evolved hydrogen. It is found, however, that under the conditions of the present invention, excellent reaction rates and yields can be obtained even with the low boiling cyclopentadiene compounds without appreciable loss with the generated hydrogen. The maintenance of a reflux system in the sodium reaction can be used to increase the efficiency of hydrocarbon utilization at the more elevated temperatures.

Ethers and amines are used in the process. Typical examples of ether are dimethyl ether, methyl ethyl ether, methyl isopropyl ether, n-isopropyl ether or a mixture of these ethers. Polyethers are also suitable in the present invention and include ethylene glycol diethers and polyethylene glycol diethers, the diethylene glycol ethers being preferred. Typical examples are ethylene glycol dimethyl ether, ethylene glycol methyl ethyl ether, ethylene glycol ethyl ethyl ether, ethylene glycol methyl butyl ether, ethylene glycol butyl lauryl ether and the like. Typical examples of the preferred diethylene glycol diethyl ethers are the dimethyl, ethyl methyl, diethyl, ethyl butyl, dibutyl, and butyl lauryl ethers. Best results are obtained with alkyl groups of from 1 to 6 carbon atoms.

Other suitable ethers are triethylene glycol ethers such as dimethyl, diethyl, methyl methyl, etc., glycerol ethers such as trimethyl, dimethyl ethyl, diethyl methyl, etc., and cyclic ethers such as dioxane, tetrahydrofuran, methyl glycerol formal and dimethylene pentaderythrite.

A wide variety of amines are suitable for use as solvents in the present invention, include both aliphatic and aromatic amines. Typical examples are dimethyl amine, trimethyl amine, dimethyl ethyl amine, tetramethyl methylene diamine, aniline, methyl aniline, dimethyl aniline, N-methyl morpholine, cyclohexylamine and the like.

The quantity of solvent which can be employed in the sodium reaction, and in the subsequent reactions can vary from about 0.2 part to about 10 parts or more per part of bis(cyclopentadienyl) manganese compound which is formed in the second step of the reaction. The more concentrated recipes are more usually preferred such for example as from about 0.5 to 1.2 mole per mole of reactants. Surprisingly, the more concentrated recipes appear to increase the reaction rate, particularly in the carbonylation step, and yet give highly fluid reaction media through the process. There are many economies involved in the use of a minimum quantity of solvent, particularly in increasing throughput of a unit reaction volume and decreased cost in the separation and recovery of the solvent.

The sodium cyclopentadienyl compound, preferably the reaction product of the first reaction, is then reacted with a manganous salt, either inorganic or organic. Best results are obtained with the manganous halides and particularly the chloride. However, very good results are also obtained with organic salts such as manganous acetate. Many of the manganous salts are hydroscopic and best results are obtained if the salt is maintained in an anhydrous form. Typical examples of suitable manganous salts are manganous chloride, bromide, iodide, fluoride, nitrate, sulphate, sulphite and various oxides such as $MnO$, $Mn_2O_3$ and the like. The quantity of manganous salt employed for reaction with the sodium cyclopentadienyl compound is important. Molar quantities of from 0.3 to about 1.5 of manganous salt to sodium cyclopentadienyl compound can be used, although it is best to use a slight excess of manganous salt. Thus from about 1.05 to 1.5 moles of manganous salt should be used per 2 moles of cyclopentadienyl sodium compound. With lower concentrations of manganous salt, the reaction medium tends to gel, making agitation and heat transfer difficult.

Higher concentrations of manganous salt can be used when a reducing agent is used in the carbonylation step, such as a group I–III metal, metal hydride or organo metal compound containing a metal to carbon bond. Under these conditions, an equal molar quantity of cyclopentadienyl sodium and manganous salt is employed.

The temperature of the manganous salt reaction can be from about 50°–250° C. A more preferred temperature range is from between 100° and 200° C. The pressure of the reaction can be atmospheric or subatmospheric. Superatmospheric pressures can also be used and is desirable when a low boiling solvent is employed, i.e. solvents which boil below reaction temperature.

The carbonylation reaction can be conducted either with gaseous carbon monoxide or with a compound which liberates carbon monoxide, such as a metal carbonyl. When gaseous carbon monoxide is employed, it is best to operate under pressure although pressures of from about atmospheric to about 10,000 p.s.i.g. can be used. Excellent reaction rates are obtained with pressures of 200 to 1000 p.s.i.g. carbon monoxide pressure.

Compounds which liberate carbon monoxide useful in this connection are any of the metal carbonyls. The desirable metal carbonyls are carbonyls of those metals having an atomic number of 23–79 of groups IB, VB, VIB and VIII of the periodic table. The group VIII metal carbonyls are particularly desirable for this purpose, especially iron pentacarbonyl.

Use of the above metal carbonyls as a source of carbon monoxide is particularly desirable since cyclopentadienyl metal by-products are formed, e.g. ferrocene is formed when using iron pentacarbonyl. These cyclopentadienyl metal by-products can thereafter be decomposed to regenerate the cyclopentadiene and metal. The cyclopentadiene can then be recycled to the process and the metal treated with additional carbon monoxide, preferably inexpensive dilute carbon monoxide, to regenerate the metal carbonyl. The regenerated metal carbonyl can also be reused in the process. A suitable technique for decomposition of cyclopentadienyl metal compounds, such as ferrocene is given in the J. of Am. Chem. Soc., vol. 79, p. 2746 et seq.

The temperature of the carbonylation reaction, as pointed out above, can be conducted at temperatures of from about 50° to 300° C., although the most preferred temperature range is from about 150° to 250° C. Very excellent reaction rates are obtained at temperatures of 190° to 250° C.

As illustrated above, the concentration of the cyclopentadienyl manganese tricarbonyl compound in the sodium reaction can be maintained below about 0.1 percent by weight of the sodium by employing a sufficiently efficient distillation, i.e. by using a sufficient number theoretical plates in a distillation column to assure essentially complete separation of the product from the solvent and unreacted cyclopentadiene hydrocarbon. If desired, incomplete physical separation can be carried out and any minor quantity of cyclopentadienyl manganese tricarbonyl product remaining in the solvent or hydrocarbon can be chemically decomposed prior to recycle of the solvent or hydrocarbon to the sodium reaction. This decomposition can be accomplished for example, by treating the recovered solvent and/or hydrocarbon with a reactant for the cyclopentadienyl manganese tricarbonyl. Typical examples of such reactants are strongly acidic or basic materials such as concentrated hydrochloric acid, sulfuric acid, hydrogen sulfide, chloroacetic acid, sodium hydroxide, potassium hydroxide and other alkali metal hydroxides, bromide, also, alkali metals such as sodium, can also be used. Thus, when the above examples are repeated using a less efficient distillation technique, the cyclopentadiene hydrocarbon and solvent (containing small quantities e.g. from 0.1 to 1.0 percent of the cyclopentadienyl manganese tricarbonyl product) are pretreated prior to recycle with from 0.5 to 10 moles of sodium sulfide, chloroacetic acid, bromine, sodium or lithium metal per mole of cyclopentadienyl tricarbonyl compound, similar results are obtained.

We claim:

1. In a cyclic process for the manufacture of cyclopentadienyl manganese tricarbonyl compounds in which sodium is first reacted with a cyclopentadiene hydrocarbon having from 5 to about 13 carbon atoms in a solvent selected from the group consisting of ethers and amines, to form the corresponding cyclopentadienyl sodium compounds, this reaction product is then reacted with a manganese salt to form the corresponding cyclopentadienyl manganese compound and this latter product is carbonylated to produce the corresponding cyclopentadienyl manganese tricarbonyl compound, the novel step of separating the solvent from at least the major portion of the cyclopentadienyl manganese tricarbonyl compound and recycling the separated solvent to said sodium reaction step, the concentration of cyclopentadienyl manganese tricarbonyl compound in said sodium reaction medium being maintained below about 0.1 percent by weight of the sodium employed in said reaction.

2. The process of claim 1 wherein the crude product obtained by carbonylating the cyclopentadienyl manganese compound, including inorganic salts and polymer, is first separated to recover the volatile components boiling below about 150° C. at 2 millimeters mercury pressure, thereafter fractionating said volatile components to separate said cyclopentadienyl manganese tricarbonyl compound from said solvent and unreacted cyclopentadiene hydrocarbon and recycling said solvent and cyclopentadiene hydrocarbon to said sodium reaction.

3. The process of claim 2 wherein said recovered cyclopentadiene hydrocarbon is dimerized prior to recycle to said sodium reaction.

4. The process of claim 1 wherein the concentration of the cyclopentadienyl manganese tricarbonyl compounds in said sodium reaction medium is maintained below about 0.085 weight percent of the sodium employed in said reaction.

5. The process of claim 4 wherein the cyclopentadienyl group contains 5 carbon atoms and the manganous salt is manganous chloride.

6. The process of claim 4 wherein the cyclopentadienyl group contains 6 carbon atoms and the manganese salt is manganous chloride.

7. The process of claim 1 wherein the solvent is an ether.

8. The process of claim 1 wherein said solvent is diethylene glycol dimethyl ether.

References Cited in the file of this patent

UNITED STATES PATENTS 2,818,417    Brown et al. _____ Dec. 31, 1957

OTHER REFERENCES

Fischer et al.: "Zeit. Naturforschg.," 8b, 444–445 (1953).

Piper et al.: "J. Inorganic Nuclear Chemistry," vol. 1, pp. 165–175 (1955).

UNITED STATES PATENT OFFICE

CERTIFICATE OF CORRECTION

Patent No. 2,915,539                  December 1, 1959

Charles R. Bergeron et al.

It is hereby certified that error appears in the printed specification of the above numbered patent requiring correction and that the said Letters Patent should read as corrected below.

Column 4, line 17, for "thte" read — the —; column 7, line 36, for "sulphite" read — sulphide —.

Signed and sealed this 23rd day of August 1960.

(SEAL)
Attest:

KARL H. AXLINE                             ROBERT C. WATSON
Attesting Officer                          Commissioner of Patents